United States Patent
Wang et al.

(10) Patent No.: US 11,664,757 B1
(45) Date of Patent: May 30, 2023

(54) MOTOR CONTROL SYSTEM WITH ADJUSTABLE VOLTAGE HARMONIC AND METHOD FOR CORRECTING THE MOTOR CONTROL SYSTEM

(71) Applicant: FORCECON TECHNOLOGY CO., LTD., Zhubei (TW)

(72) Inventors: Shih-Chieh Wang, Zhubei (TW); Cheng-Tai Cheng, Zhubei (TW); Ming-Ho Hsu, Zhubei (TW)

(*) Notice: Subject to any disclaimer, the term of this patent is extended or adjusted under 35 U.S.C. 154(b) by 0 days.

(21) Appl. No.: 17/745,031

(22) Filed: May 16, 2022

(51) Int. Cl.
    *H02M 1/42* (2007.01)
    *H02P 29/50* (2016.01)
    *H02P 27/06* (2006.01)
    *H02M 7/5387* (2007.01)

(52) U.S. Cl.
    CPC .............. *H02P 29/50* (2016.02); *H02P 27/06* (2013.01); *H02M 7/53871* (2013.01)

(58) Field of Classification Search
    CPC .... H02P 29/50; H02P 27/06; H02M 7/53871; H02M 1/4225; B62D 5/0472
    See application file for complete search history.

(56) References Cited

U.S. PATENT DOCUMENTS

2007/0052381 A1* 3/2007 Ueda .................... B62D 5/0472
    318/432
2019/0222135 A1* 7/2019 Sakakibara ......... H02M 1/4225

* cited by examiner

*Primary Examiner* — Cortez M Cook
(74) *Attorney, Agent, or Firm* — Egbert, McDaniel & Swartz, PLLC

(57) ABSTRACT

A motor control system with adjustable voltage harmonic and a method for correcting the motor control system is disclosed. Based on the input modulation order, the motor control system drives and controls a motor. The motor control system includes: a control order selection unit to generate a control order based on the modulation order, a modulation signal control unit used to generate a pulse output duty ratio modulation signal, a harmonic voltage weight selection unit used to select the weight value of the harmonic wave, a pulse modulation part to generate a control signal based on the modulation signal indicating the pulse output duty ratio, the weight value of the harmonic wave, and the pulse modulation carrier frequency signal. Based on the control signal, the inverter circuit adds the harmonic voltage into the motor-driving voltage to drive the motor, so as to reduce the noise or vibration of the motor.

5 Claims, 14 Drawing Sheets

MOTOR CONTROL SYSTEM WITH ADJUSTABLE VOLTAGE HARMONIC AND METHOD FOR CORRECTING THE MOTOR CONTROL SYSTEM

CROSS-REFERENCE TO RELATED U.S. APPLICATIONS

Not applicable.

BACKGROUND OF THE INVENTION

1. Field of the Invention

The present invention relates generally to a motor control system, and more particularly to a motor control system with adjustable voltage harmonic and a method for correcting the motor control system.

2. Description of Related Art Including Information Disclosed Under 37 CFR 1.97 and 37 CFR 1.98

Torque ripple refers to the phenomenon of cyclic variation of the output torque during the operation of the motor. In an electric motor, the torque ripple often causes noises and vibrations. The torque ripple can be improved by controlling the operation of the motor through an appropriate voltage waveform.

The prior-art modulation of the pulse width technology can modulate the waveform of the phase voltage output by the motor into a sine wave. FIG. 1A and FIG. 1B depict the waveform curve of the seven-phase SVPWM (short for Space Vector Pulse-Width Modulation) conducted by the prior-art computer simulation technique, wherein Va, Vb and Vc are respectively the modulated terminal voltage waveform curves, Vas, Vbs and Vcs are respectively phase voltage waveform curves input for the motor. FIG. 2 depicts the waveform curve indicating the modulation of the pulse width conducted by the prior art when the duty ratio of the computer simulated pulse output of the modulation signal is 75%, wherein Kea, Keb and Kec are respectively the opposing electromotive force constants, which are not distributed in a standard sine wave. This is a common phenomenon in the case of small motors. Ia, Ib and Ic are respectively phase currents, Te is the torque variation curve during operation of the motor. The prior art based on the principle of generating a sine wave phase voltage driving waveform still has some shortcomings in improving the phenomenon of torque ripple.

BRIEF SUMMARY OF THE INVENTION

The main object of the present invention is to provide a motor control system with adjustable voltage harmonic and a method for correcting the motor control system.

In light of the above object, the present invention solves the existing problem through the main technical feature that the motor control system with adjustable voltage harmonic can drive and control a motor on the basis of the input modulation order;

said motor control system includes a control order selection unit, a modulation signal control unit, a harmonic voltage weight selection unit, a pulse modulation part, an inverter circuit, and a feedback device, wherein said control order selection unit is connected to said modulation signal control unit and said harmonic voltage weight selection unit, said modulation signal control unit and said harmonic voltage weight selection unit are respectively connected to said pulse modulation part, said pulse modulation part is connected to said inverter circuit, said inverter circuit is connected to said motor, said feedback device is connected to said modulation signal control unit and said motor, said feedback device is used to detect the operating status of said motor, and to transmit a first operation signal to said modulation signal control unit, and said first operation signal includes the speed and torque of said motor;

said control order selection unit converts said modulation order indicating the duty ratio into a control order, said control order refers to speed order or torque order;

said modulation signal control unit is used to generate a pulse output duty ratio modulation signal based on said control order and said first operation signal;

said harmonic voltage weight selection unit includes a storage part and a selection part, said storage part and said selection part are connected to each other, said selection part is connected to said control order selection unit and said pulse modulation part, said storage part is used to store multiple weight values of the harmonic wave of said harmonic voltage, based on said control order, said selection part selects the weight value of the harmonic wave corresponding to said harmonic voltage to be generated;

said pulse modulation part is used to receive the modulation signal indicating the pulse output duty ratio and the weight value of the harmonic wave, based on the modulation signal indicating the pulse output duty ratio, the weight value of the harmonic wave and the externally input pulse modulation carrier frequency signal, the plurality of control signals are generated;

said inverter circuit includes the plurality of electronic power switches, and is used to receive the control signal, based on the actuation of the control signal, the electronic power switches adds harmonic voltage into the motor-driving voltage to drive the motor;

specifically, the weight value of the harmonic wave is defined as the ratio of the voltage harmonic peak value to the voltage dominant frequency peak value.

The method for correcting the motor control system can adapt the motor control system to a motor; said method including the following steps:

creating the correcting structure: said motor is configured with a detector, said detector is used to detect the vibration or noise of said motor, and to generate a second operating signal, said detector is connected to a correcting device, said motor control system includes a control order selection unit, a modulation signal control unit, a harmonic voltage weight selection unit, a pulse modulation part, an inverter circuit and a feedback device, wherein said control order selection unit is connected to an order generating device, said order generating device is used to generate a modulation order, said control order selection unit converts said modulation order indicating the duty ratio into a control order, said control order refers to speed order or torque order, said harmonic voltage weight selection unit is connected to the correcting device, said correcting device is used to adjust the selection of the weight value of the harmonic wave corresponding to said control order, said control order selection unit is connected to said modulation signal control unit and said harmonic voltage weight selection unit, said modulation signal control unit and said harmonic voltage weight selection unit are respectively connected to said pulse modulation part, said pulse modulation part is connected to said inverter circuit, said inverter circuit is connected to said motor, said feedback device is connected to said motor and said modulation signal control unit, said feedback device is used to detect the operating status of said motor, and to transmit a first operation signal to said modulation signal control unit, said first operation signal includes the speed and torque of said motor, said modulation signal control unit is used to generate a pulse output duty ratio modulation signal based on said control order and said first operation signal, said harmonic voltage weight selection unit stores the plurality of the weight value of the harmonic wave of the harmonic voltage, said harmonic voltage weight selection unit includes a selection part, said selection part is used to select the corresponding weight value of the harmonic wave based on said control order, said pulse modulation part generates the plurality of control signals based on the modulation signal indicating the pulse output duty ratio, the weight value of the harmonic wave, and the externally input pulse modulation carrier frequency signal, said inverter circuit drives the motor based on the control signal;

issuing a modulation order: the order generating device issues the modulation order to the motor control system;

detection: the detector detects the vibration or noise of the motor, and generates the second operating signal;

checking the operating status of the motor: based on the second operating signal, the correcting device judges if the degree of vibration or noise of the motor meets the anticipation of said control order;

adjusting the selection of the weight value of the harmonic wave: if the degree of vibration or noise of said motor meets the anticipation of said control order, the correcting device maintains the corresponding weight value of the harmonic wave selected by said harmonic voltage weight selection unit based on said control order, if the degree of vibration or noise of the motor does not meet the anticipation of said control order, the correcting device removes the corresponding weight value of the harmonic wave selected by said harmonic voltage weight selection unit based on said control order;

repeatedly executing the step to issue the modulation order, the detection step, the step to check the operating status of the motor, and the step to adjust the selection of the weight value of the harmonic wave, so as to adapt the motor control system to the motor;

in particular, when executing the step to adjust the selection of the weight value of the harmonic wave, the weight value of the harmonic wave selected by said harmonic voltage weight selection unit based on said control order is maintained, and the step to issue the modulation order is executed again, a different control order is issued to the motor control system;

when executing the step to adjust the selection of the weight value of the harmonic wave, the weight value of the harmonic wave selected by said harmonic voltage weight selection unit based on said control order is removed, and the step to issue the modulation order is executed again, the same control order is issued to the motor control system, thus, the weight value of the harmonic wave stored by said harmonic voltage weight selection unit is adapted to said control order.

The main efficacy and advantage of the invention is that it can reduce the noise and vibration of the motor by modulating the voltage waveform.

DETAILED DESCRIPTION OF THE INVENTION

FIG. 3 to FIG. 14 are illustrations of the preferred embodiment of the motor control system with adjustable voltage harmonic and method for correcting the motor control system according to the invention.

Figure 1A:
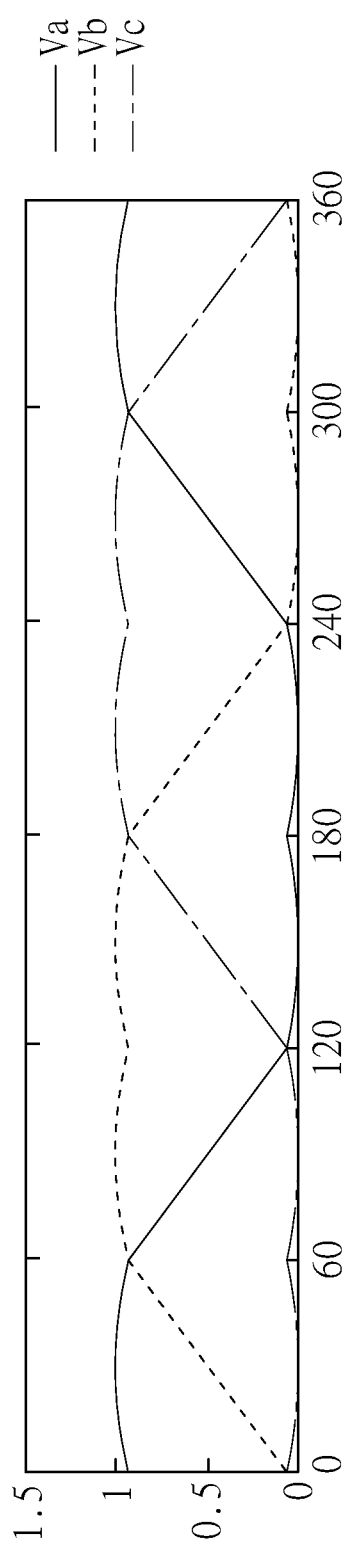
FIG. 1A and FIG. 1B depict the waveform curves of the terminal voltages and phase voltages during modulation of the pulse width conducted by the prior art.
Figure 1B:
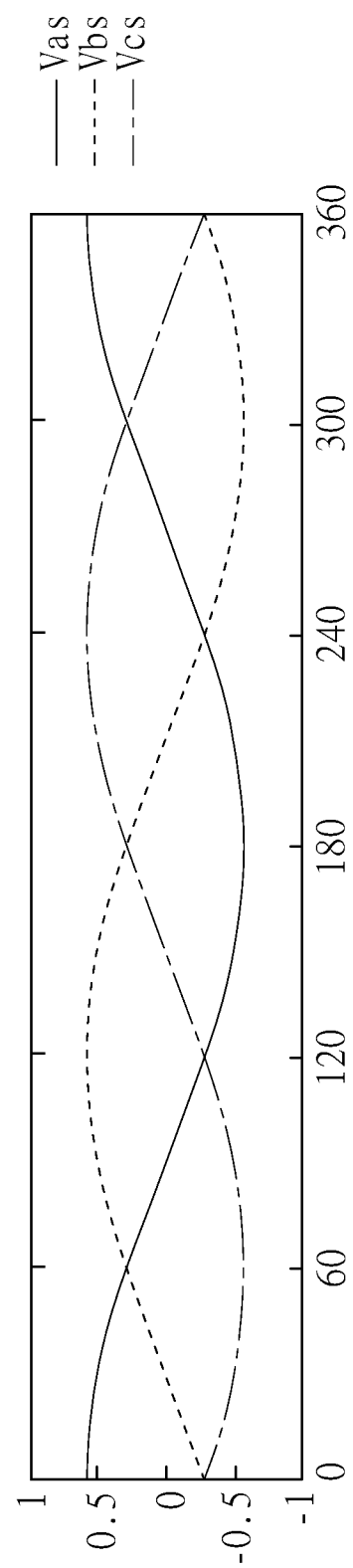
Figure 2:
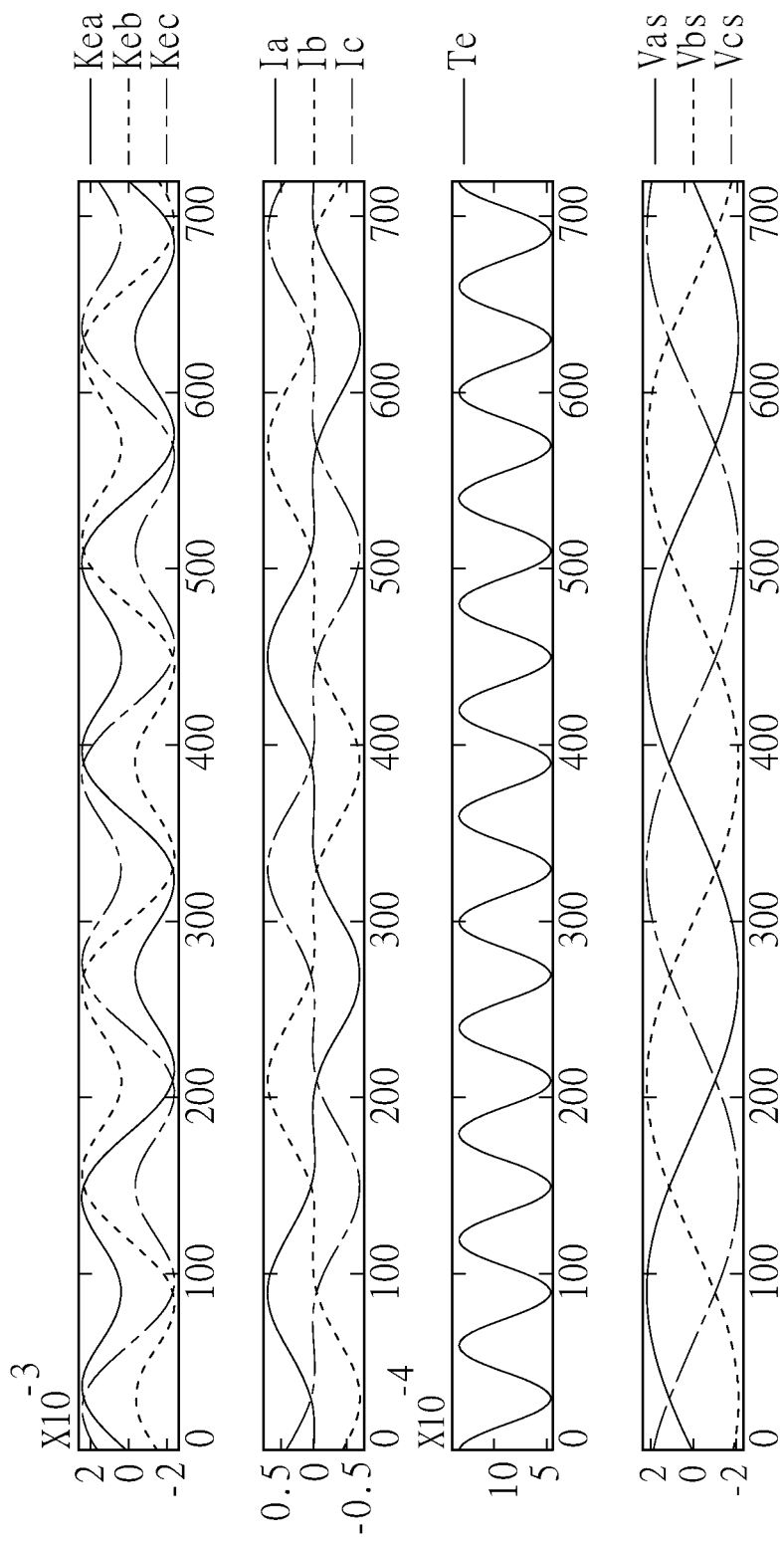
FIG. 2 depicts the torque wave of the running motor during modulation of the pulse width conducted by the prior art.
Figure 3:
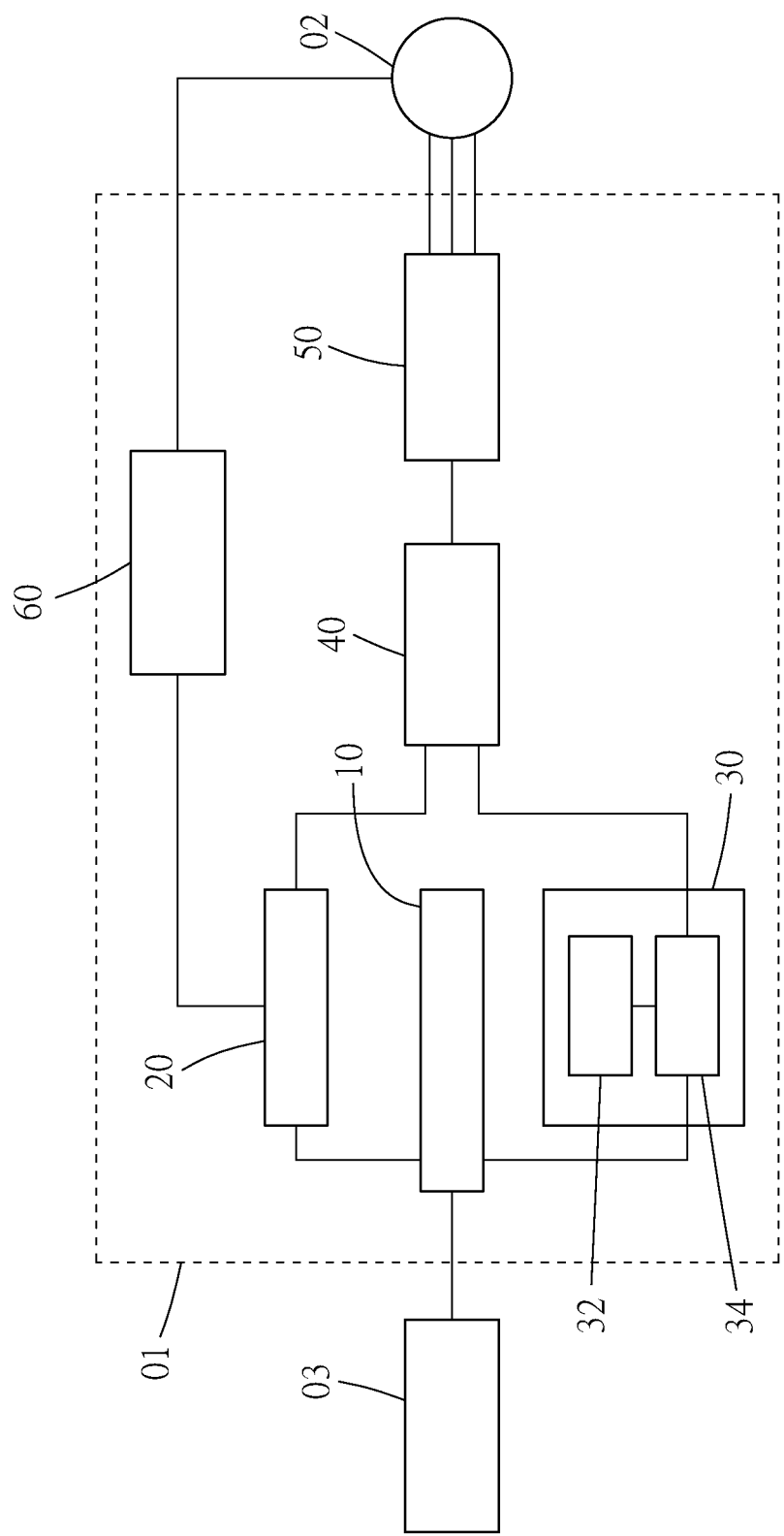
FIG. 3 is a circuit structure diagram of a preferred embodiment of the motor control system according to the invention.
Figure 4:
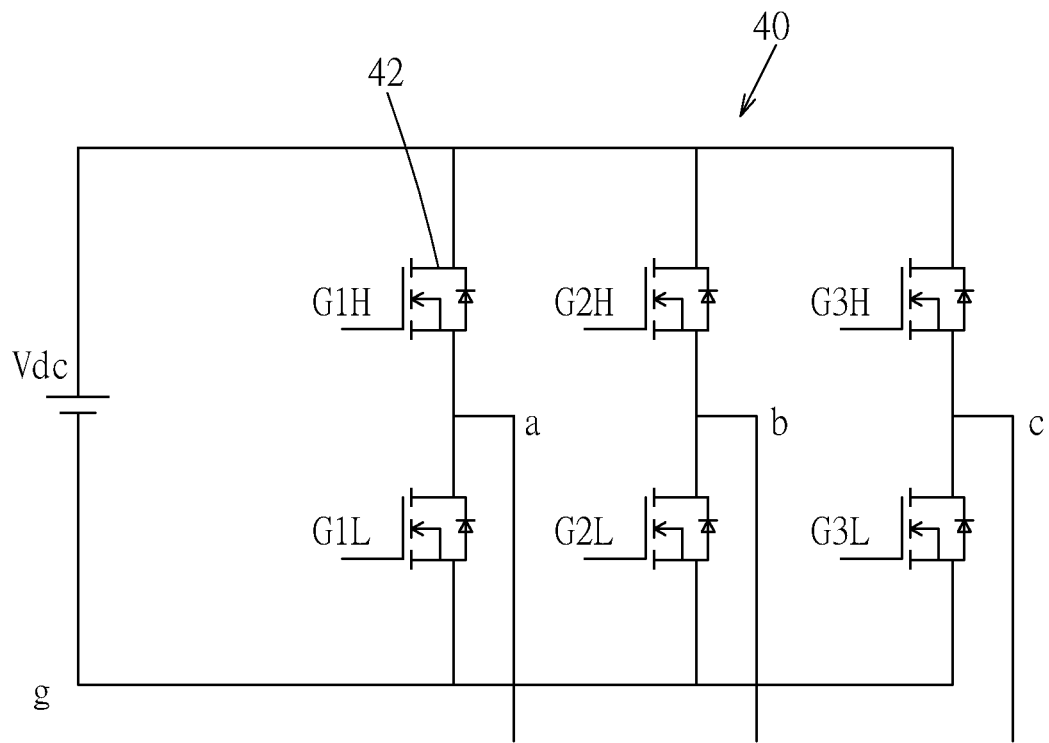
FIG. 4 is a circuit diagram of the inverter circuit of a preferred embodiment of the motor control system according to the invention.
Figure 5:
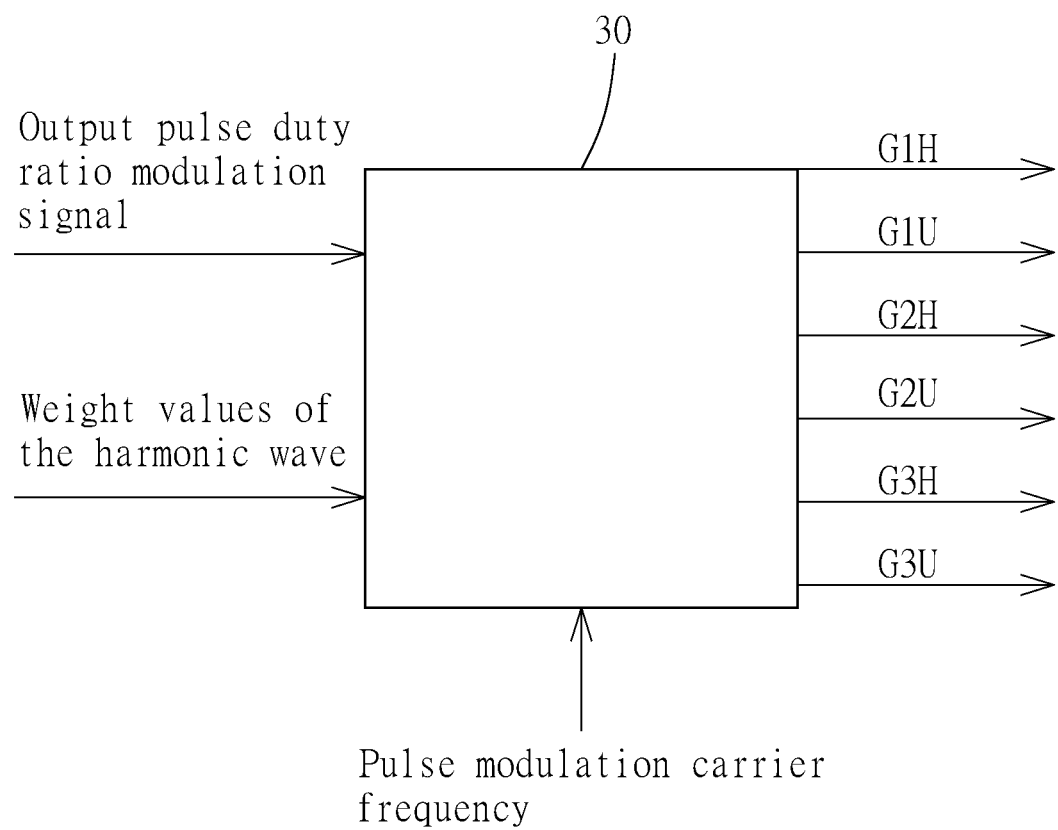
FIG. 5 is an operational view of the pulse modulation part of a preferred embodiment of the motor control system according to the invention.
Figure 6A:
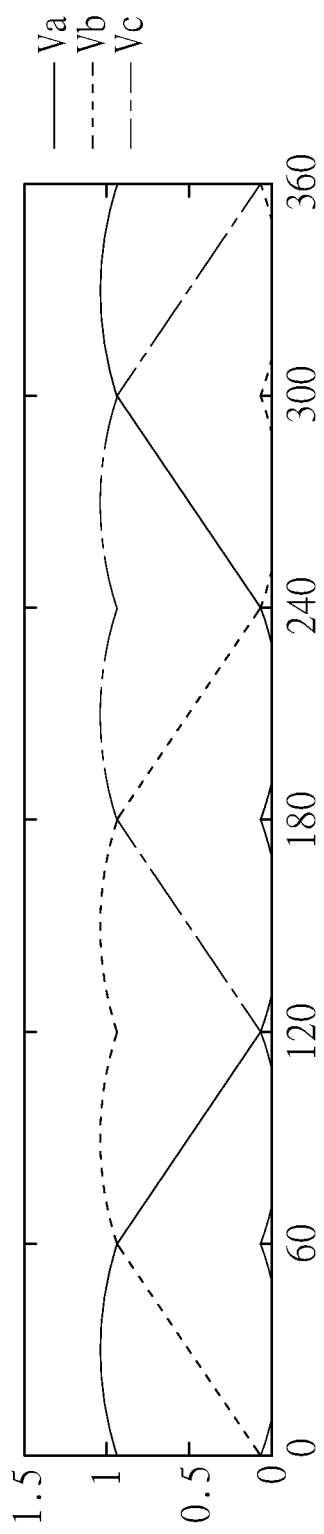
FIG. 6A and FIG. 6B are waveform curves of the terminal voltages and phase voltages during modulation of the pulse width when 3-phase harmonic voltage is introduced into the preferred embodiment of the invention and the weight values of the harmonic wave is 0.1.
Figure 6B:
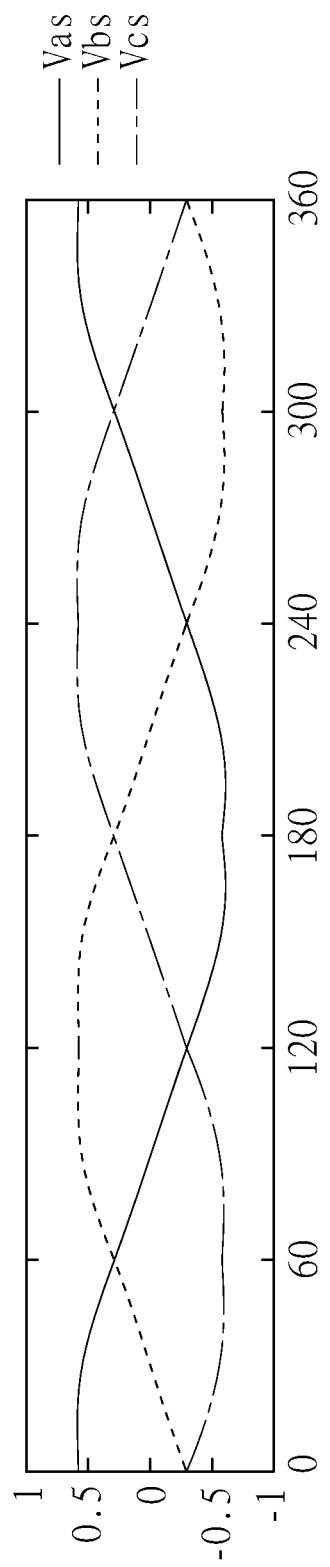
Figure 7A:
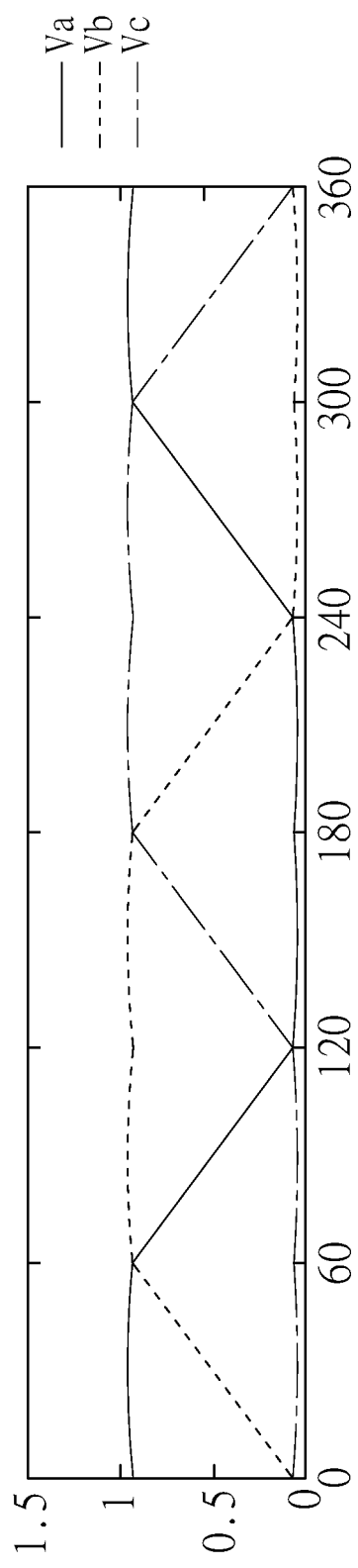
FIG. 7A and FIG. 7B are waveform curves of the terminal voltages and phase voltages during modulation of the pulse width when 3-phase harmonic voltage is introduced into the preferred embodiment of the invention and the weight values of the harmonic wave is −0.1.
Figure 7B:
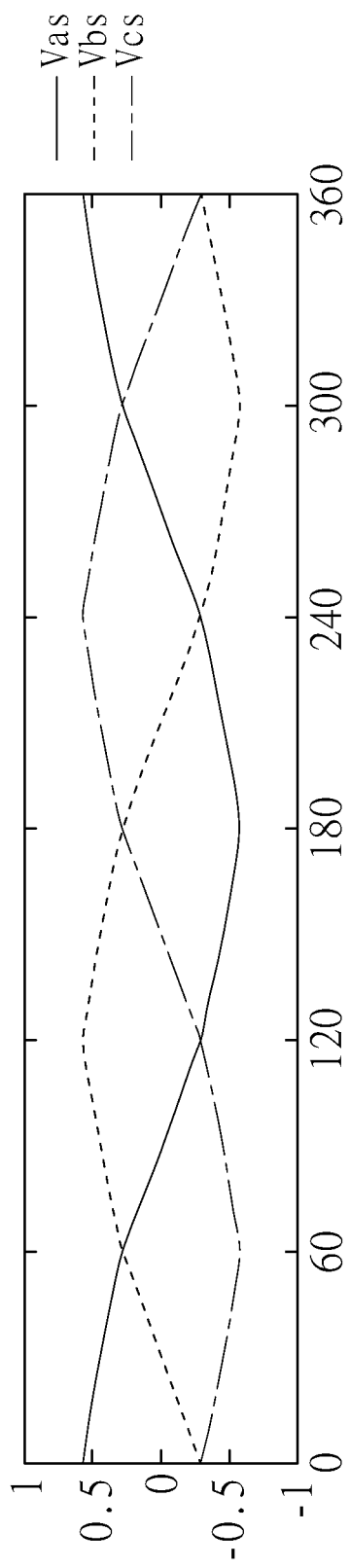
Figure 8:
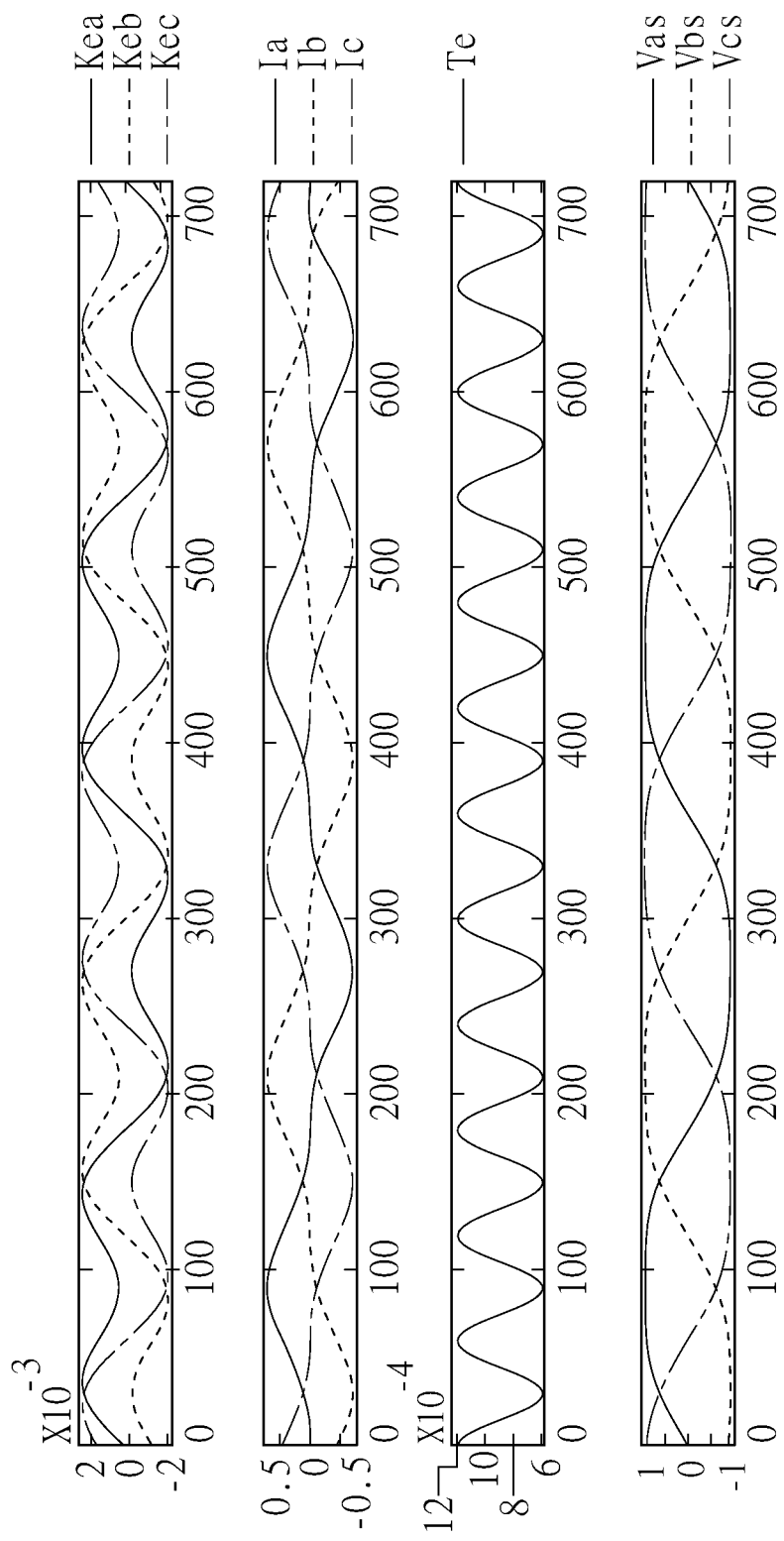
FIG. 8 is the torque wave of the running motor during modulation of the pulse width when 3-phase harmonic voltage is introduced into the preferred embodiment of the invention and the weight values of the harmonic wave is 0.1.
Figure 9:
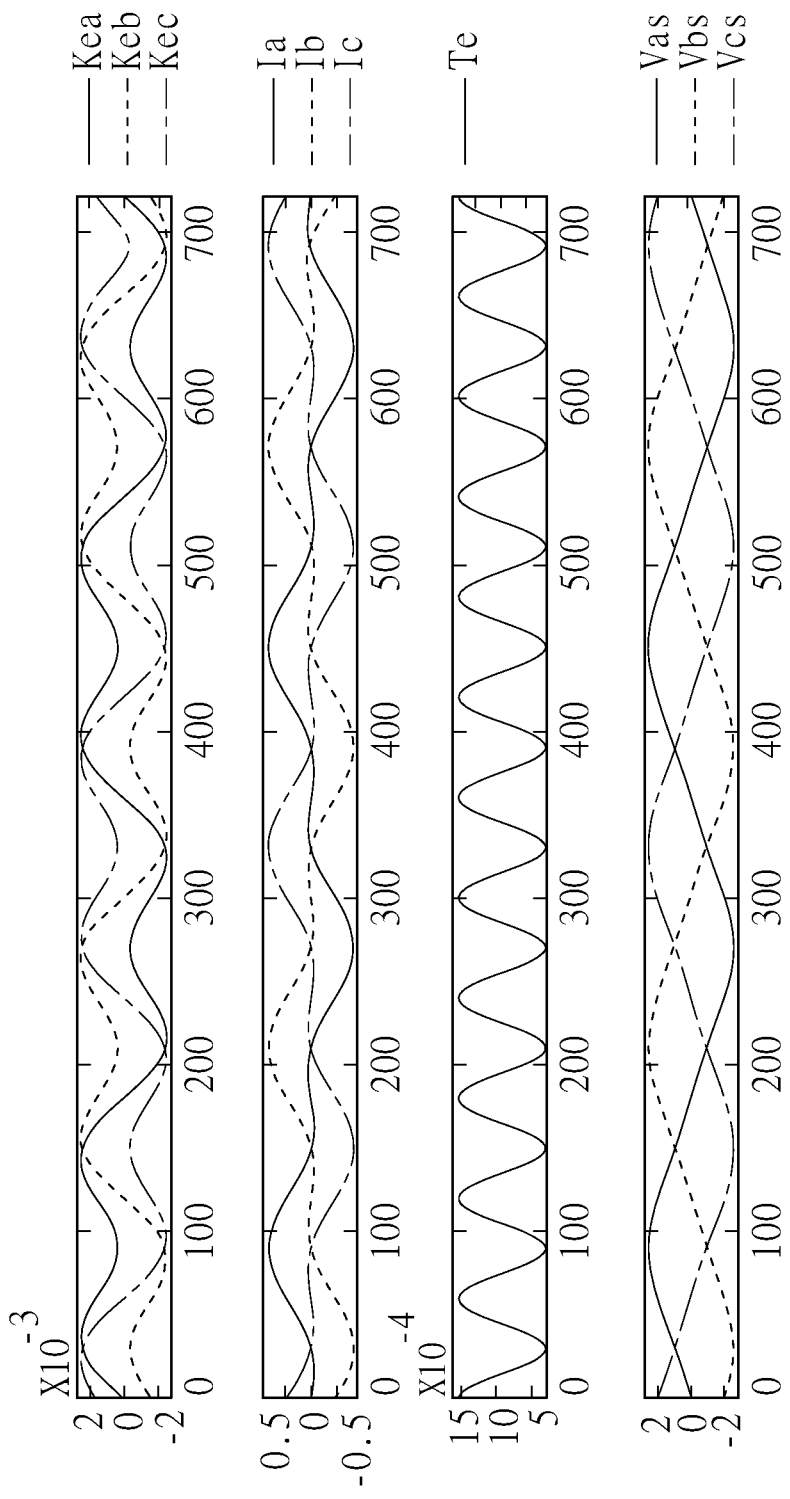
FIG. 9 is the torque wave of the running motor during modulation of the pulse width when 3-phase harmonic voltage is introduced into the preferred embodiment of the invention and the weight value of the harmonic wave is −0.1.

Referring to FIG. 3 to FIG. 5, the motor control system with adjustable voltage harmonic 01 drives and controls a motor 02 on the basis of the input modulation order. The motor control system 01 includes a control order selection unit 10, a modulation signal control unit 20, a harmonic voltage weight selection unit 30, a pulse modulation part 40, an inverter circuit 50 and a feedback device 60, wherein the control order selection unit 10 is connected to the modulation signal control unit 20 and the harmonic voltage weight selection unit 30, the modulation signal control unit 20 and the harmonic voltage weight selection unit 30 are respectively connected to the pulse modulation part 40, the pulse modulation part 40 is connected to the inverter circuit 50, the inverter circuit 50 is connected to the motor 02, the feedback device 60 is connected to the modulation signal control unit 20 and the motor 02, the feedback device 60 is used to detect the operating status of the motor 02, and to transmit a first operation signal to the modulation signal control unit 20, and the first operation signal includes the speed and torque of the motor 02.

The control order selection unit 10 is mainly made up of an electronic circuit. The control order selection unit 10 converts the modulation order indicating the duty ratio into a control order, and transmits the control order respectively to the modulation signal control unit 20 and the harmonic voltage weight selection unit 30. The control order refers to speed order or torque order.

The modulation signal control unit 20 is mainly made up of an electronic circuit. Based on the control order and the first operation signal, the modulation signal control unit 20 generates a modulation signal indicating the pulse output duty ratio. Thus, the modulation signal control unit 20 and work with the feedback device 50 to automatically correct the modulation signal indicating the pulse output duty ratio.

The harmonic voltage weight selection unit 30 is mainly made up of an electronic circuit. The harmonic voltage weight selection unit 30 includes a storage part 32 and a selection part 34. The storage part 32 and the selection part 34 are connected to each other. The selection part 34 is connected to the control order selection unit 10 and the pulse modulation part 40. The storage part 32 is used to store multiple weight values of the harmonic wave of the harmonic voltage. The weight value of the harmonic wave is defined as the ratio of the voltage harmonic peak value to the voltage dominant frequency peak value. Based on the control order, the selection part 34 selects the weight value of the harmonic wave corresponding to the harmonic voltage to be generated.

A logic circuit is an example of the selection part 34. However, the selection part 34 is not limited to a logic circuit.

The pulse modulation part 40 is mainly made up of an electronic circuit. The pulse modulation part 40 is used to receive the modulation signal indicating the pulse output duty ratio and the weight value of the harmonic wave, and to generate a plurality of control signals based on the modulation signal indicating the pulse output duty ratio, the weight value of the harmonic wave and the externally input pulse modulation carrier frequency signal.

The inverter circuit 50 includes a plurality of electronic power switches 52. The inverter circuit 50 is used to receive the control signal. Based on the actuation of the control signal, the electronic power switches 52 adds the harmonic voltage into the motor-driving voltage, to drive the operation of the motor 02.

As in the aforesaid preferred embodiment, the motor control system 01 can be used to control the motor 02. A three-phase permanent magnet motor is a preferred embodiment of the motor 02. The motor control system 01 can also be used to control motors of other forms. When the motor control system 01 is used to control the motor 02, the motor control system 01 is connected to an order generating device 03. The order generating device 03 is mainly made up of an electronic circuit. The order generating device 03 is used to generate the modulation order. The control order selection unit 10 is connected to the order generating device 03. Through the control order selection unit 10, the motor control system 01 converts the modulation order generated by the order generating device 03 into the control order to control the speed or torque of the running motor 02.

The harmonic voltage is a 3-phase harmonic voltage, or a 5-phase harmonic voltage, or a 7-phase harmonic voltage, or a combination thereof. The weight values of the harmonic wave are positive values, negative values, or zero. The weight values of the harmonic wave come from the correcting tests to reduce noise or vibration during the OFF-LINE operation state when the motor 02 is not connected to a load.

The plurality of the weight values of the harmonic wave stored by the storage part 32 are respectively corresponding to different control orders. Based on the modulation signal indicating the pulse output duty ratio and the weight value of the harmonic wave corresponding to the control order, together with the pulse modulation carrier frequency signal, the pulse modulation part 40 generates a plurality of control signals. Each of the control signals respectively controls each of the electronic power switches 52 to modulate the waveform of the current that powers the motor 02. The current waveform is not limited to sine wave. According to the prior art, three-phase currents without harmonic wave is the optimum selection to drive the motor. The purpose of the modulation of the prior art by controlling the operation of the motor is to remove the harmonic wave in the three-phase current. As shown in FIG. 6A, FIG. 6B, FIG. 7A, FIG. 7B, FIG. 8 and FIG. 9, based on the duty ratio of the modulation order, the preferred embodiment appropriately adds 3, 5, 7-phase harmonic waves into the phase currents, to control the torque variation of the motor 02, and to improve the phenomenon of torque ripple of the motor 02, thus reducing noise and vibration caused by the phenomenon of torque ripple. Meanwhile, because of the change of the 10 phase voltage, it also reduces noise and vibration caused by magnetic disturbance in the axial direction and the eccentricity between the stator and the rotor of the motor 02.

Figure 10:
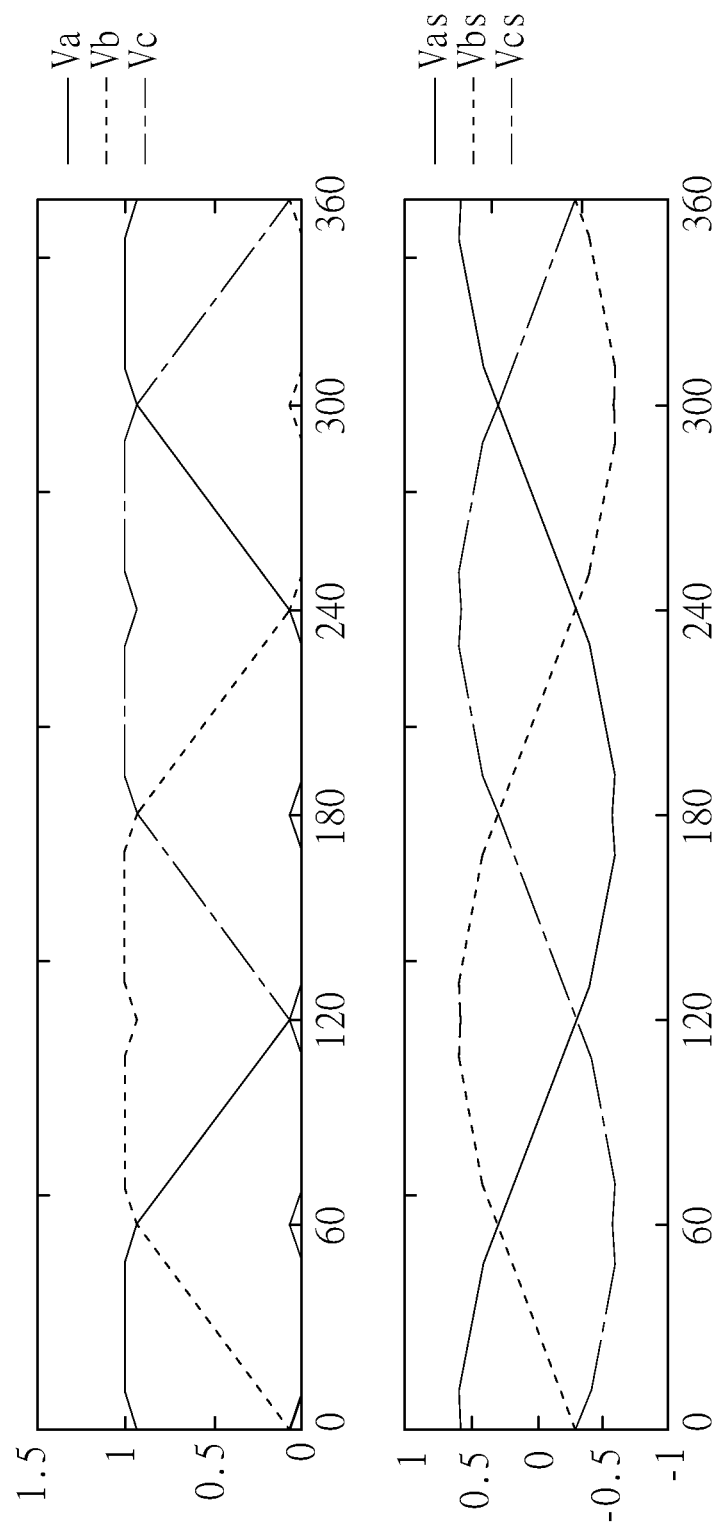
FIG. 10 is a waveform curve of the terminal voltages and phase voltages during modulation of the pulse width when 3-phase harmonic voltage is introduced into the preferred embodiment of the invention and the weight value of the harmonic wave is 0.1, when a voltage saturation limit is formed, and the modulation coefficient is 1.
Figure 11:
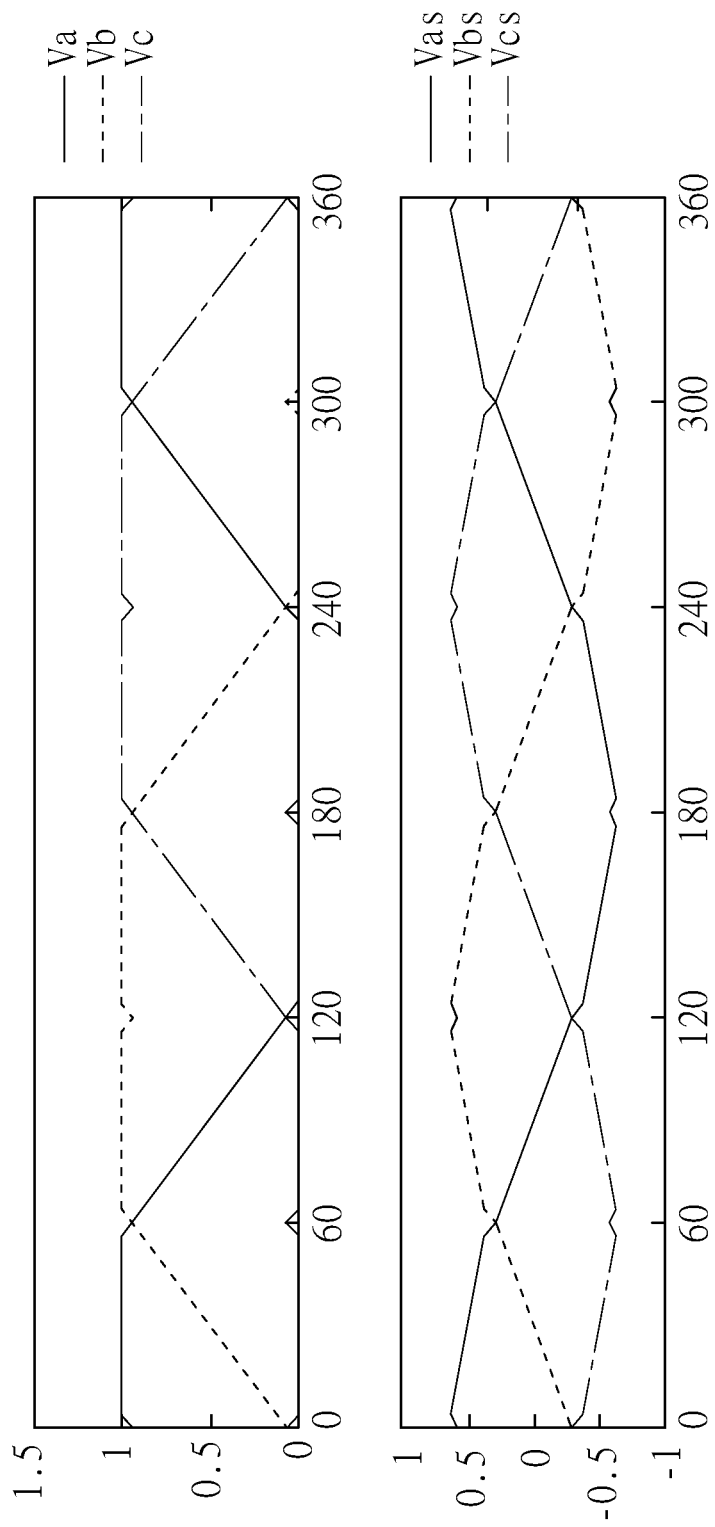
FIG. 11 is a waveform curve of the terminal voltages and phase voltages during modulation of the pulse width when 3-phase harmonic voltage is introduced into the preferred embodiment of the invention and the weight value of the harmonic wave is 0.5, when a voltage saturation limit is formed, and the modulation coefficient is 1.
Figure 12:
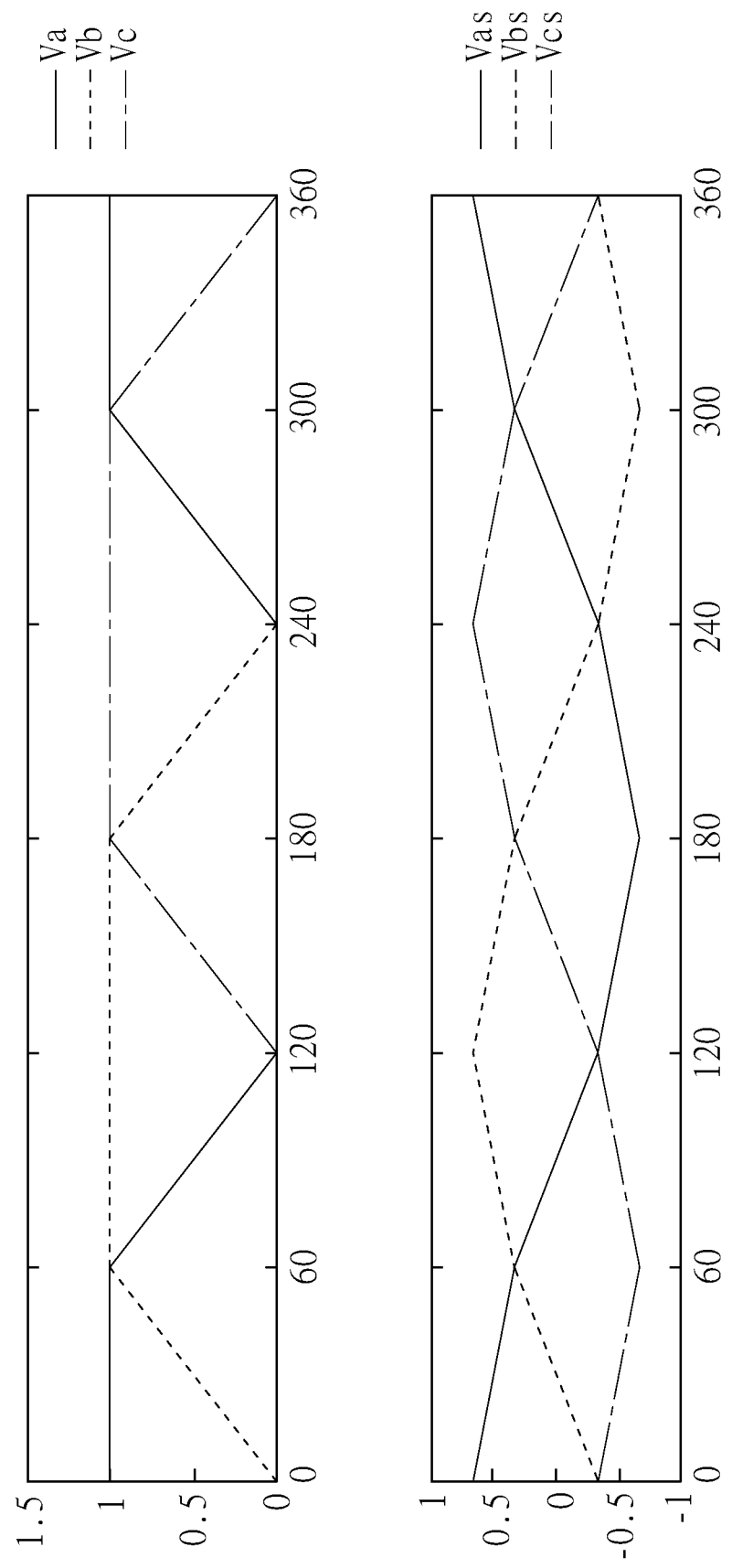
FIG. 12 is a waveform curve of the terminal voltages and phase voltages during modulation of the pulse width when 3-phase harmonic voltage is introduced into the preferred embodiment of the invention and the weight value of the harmonic wave is 0.5, when a voltage saturation limit is formed, and the modulation coefficient is 1.5.

Referring to FIG. 10 through FIG. 12, during high-speed operation of the motor 02, the modulated voltage tends to be saturated, and the voltage waveform is gradually transformed from a similarly M wave to a trapezoidal wave, which enhances the voltage utilization ratio and increases the maximum speed of the motor 02.

Figure 13:
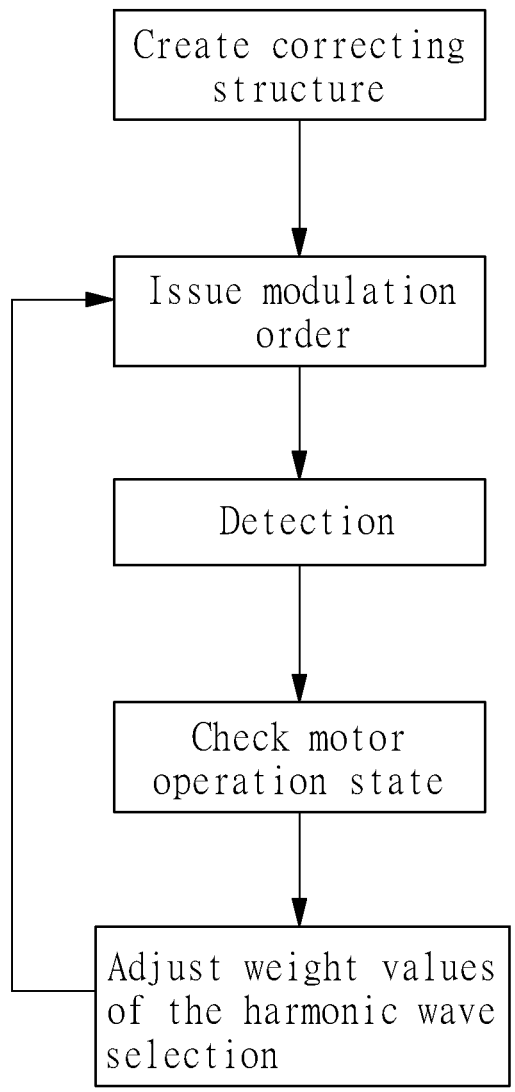
FIG. 13 is a flow chart of the method for correcting the motor control system according to a preferred embodiment of the invention.
Figure 14:
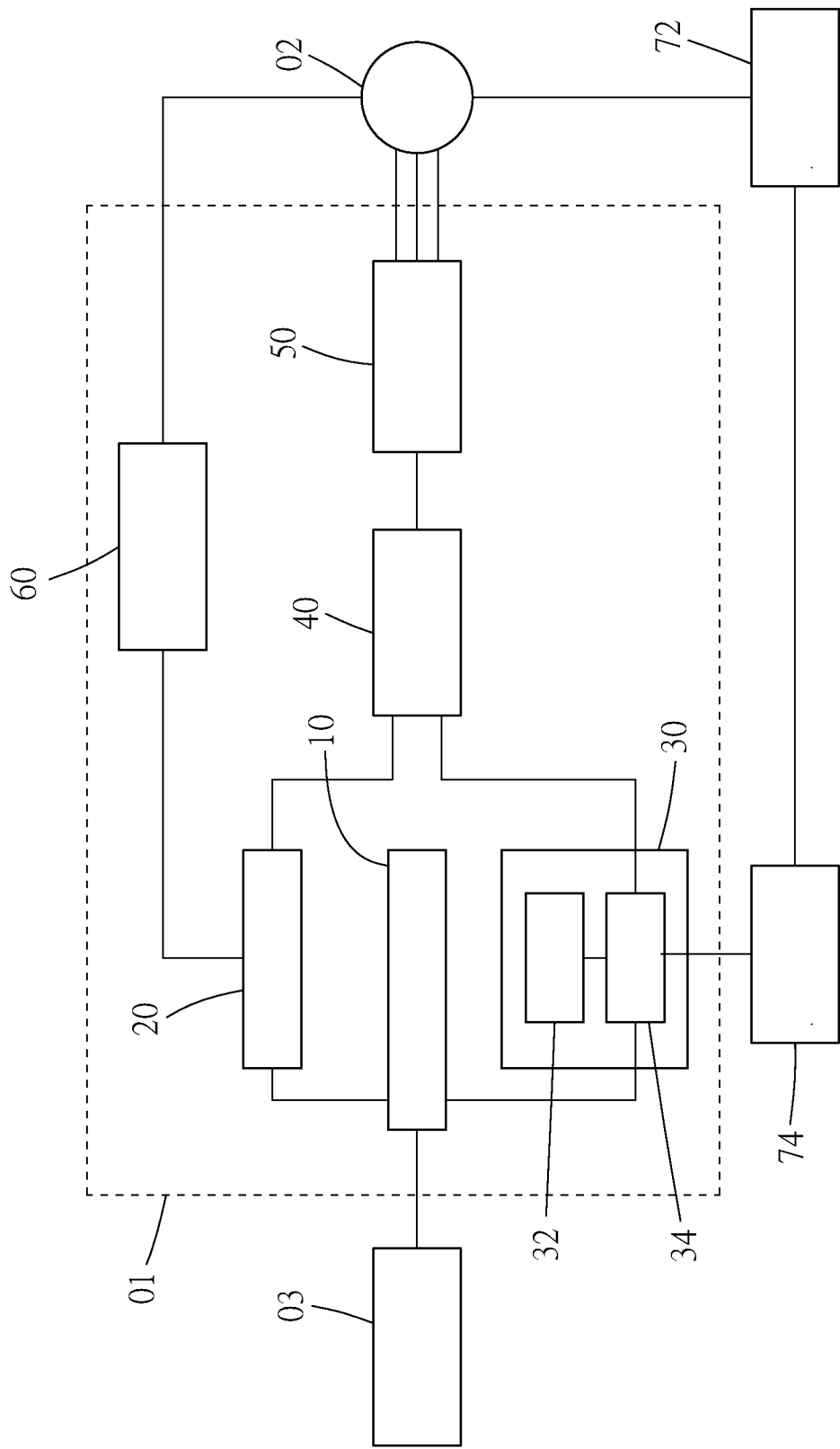
FIG. 14 is a schematic view of the correcting structure of the method for correcting the motor control system according to a preferred embodiment of the invention.

Referring to FIG. 13 and FIG. 14, the method for correcting the motor control system 01 is mainly used to correct the harmonic voltage weight selection unit 20, so that the plurality of the weight values of the harmonic wave stored by the harmonic voltage weight selection unit 20 can be respectively adapted to multiple operational requirements of the motor 02. Thus, the motor control system 01 can be adapted to the motor 02.

The method for correcting the motor control system 01 includes the following steps:

Creating the correcting structure: The motor 02 is configured with a detector 72. The detector is used to detect the vibration or noise of the running motor 02, and to generate a second operating signal. The second operating signal is vibration signal or noise signal. The detector 72 is connected to a correcting device 74. The correcting device 74 is mainly made up of electronic circuits containing a microprocessor with executable programs. The motor control system 01 includes the control order selection unit 10, the modulation signal control unit 20, the harmonic voltage weight selection unit 30, the pulse modulation part 40, the inverter circuit 50, and the feedback device 60, wherein the control order selection unit 10 is connected to the order generating device 03, the harmonic voltage weight selection unit 30 is connected to the correcting device 74, the correcting device 74 can be used to alter the selection of the plurality of weight values of the harmonic waves stored by the harmonic voltage weight selection unit 10 according to different modulation orders. The inverter circuit 50 is connected to the motor 02.

Issuing a modulation order: The order generating device 03 issues the modulation order to the motor control system 01. Based on the modulation order, the control order selection unit 10 transmits the control order respectively to the modulation signal control unit 20 and the harmonic voltage weight selection unit 30.

Detection: the detector 72 detects the operating status of the motor 02, and generates the second operating signal.

Checking the operating status of the motor: According to the vibration or noise indicated by the second operating signal, the correcting device 74 judges if the degree of vibration or noise generated by the running motor 02 meets the anticipation of the control order.

Adjusting the selection of weight value of the harmonic wave: If the degree of vibration or noise of the motor 02 meets the anticipation of the control order, the correcting device 74 maintains the corresponding weight value of the harmonic wave selected by the harmonic voltage weight selection unit 30 based on the control order. If the degree of vibration or noise of the motor 02 does not meet the anticipation of the control order, the correcting device 74 removes the corresponding weight value of the harmonic wave selected by the harmonic voltage weight selection unit 30 based on the control order. Thus, when the harmonic voltage weight selection unit 30 selects the same weight value of the harmonic wave based on the same control order, the removed weight value of the harmonic wave will not be selected again.

Repeatedly executing the step to issue the modulation order, the detection step, the step to check the operating status of the motor, and the step to adjust the selection of the weight value of the harmonic wave, so as to adapt the motor control system 01 to the motor 02.

When executing the step to adjust the selection of the weight value of the harmonic wave, the weight value of the harmonic wave selected by the harmonic voltage weight selection unit 30 based on the control order is maintained, and the step to issue the modulation order is executed again, a different control order is issued to the motor control system 01; When executing the step to adjust the selection of the weight value of the harmonic wave, the weight value of the harmonic wave selected by the harmonic voltage weight selection unit 20 based on the control order is removed, and the step to issue the modulation order is executed again, the same control order is issued to the motor control system 01. Thus, the weight value of the harmonic wave stored by the harmonic voltage weight selection unit 10 is adjusted to be adapted to the control order.

During the step to control the operation of the motor, the inverter circuit 50 selects to drive the motor 02 to run in the offline state. The inverter circuit 50 can also select to drive the motor 02 to run in the state with load connection. The load is determined by the usage of the motor 02. Fan blades are an example of the load.

The components of motors 02 of the same specifications produced by the same manufacturer may come from different suppliers. Even if the components come from the same suppliers, there may be slight differences between different production batches, and the operation state of the motors 02 produced in different batches may also differ. Through the above-described correcting method, the motor control system 01 can be adapted to a motor 02 from a specific production batch, thus solving the problem that the motor control system 01 may not be adapted to motors 02 from different production batches.

We claim:

1. A motor control system with adjustable voltage harmonic drives and controls a motor on the basis of the input modulation order;

said motor control system includes a control order selection unit, a modulation signal control unit, a harmonic voltage weight selection unit, a pulse modulation part, an inverter circuit, and a feedback device, wherein said control order selection unit is connected to said modulation signal control unit and said harmonic voltage weight selection unit, said modulation signal control unit and said harmonic voltage weight selection unit are respectively connected to said pulse modulation part, said pulse modulation part is connected to said inverter circuit, said inverter circuit is connected to said motor, said feedback device is connected to said modulation signal control unit and said motor, said feedback device is used to detect the operating status of said motor, and to transmit a first operation signal to said modulation signal control unit, and said first operation signal includes the speed and torque of said motor;

said control order selection unit converts said modulation order indicating the duty ratio into a control order, said control order refers to speed order or torque order;

said modulation signal control unit is used to generate a pulse output duty ratio modulation signal based on said control order and said first operation signal;

said harmonic voltage weight selection unit includes a storage part and a selection part, said storage part and said selection part are connected to each other, said selection part is connected to said control order selection unit and said pulse modulation part, said storage part is used to store multiple weight values of the harmonic wave of said harmonic voltage, based on said control order, said selection part selects the weight value of the harmonic wave corresponding to said harmonic voltage to be generated;

said pulse modulation part is used to receive the modulation signal indicating the pulse output duty ratio and the weight value of the harmonic wave, based on the modulation signal indicating the pulse output duty ratio, the weight value of the harmonic wave and the externally input pulse modulation carrier frequency signal, the plurality of control signals are generated;

said inverter circuit includes the plurality of electronic power switches, and is used to receive the control signal, based on the actuation of the control signal, the electronic power switches adds harmonic voltage into the motor-driving voltage to drive the motor;

specifically, the weight value of the harmonic wave is defined as the ratio of the voltage harmonic peak value to the voltage dominant frequency peak value.

2. The motor control system defined in claim 1, wherein the harmonic voltage is a 3-phase harmonic voltage, or a 5-phase harmonic voltage, or a 7-phase harmonic voltage, or a combination thereof.

3. The motor control system defined in claim 1, wherein said weight values of the harmonic wave are positive values, negative values, or zero.

4. A method for correcting the motor control system defined in claim 1, used to adapt the motor control system to a motor; said method includes the following steps:

creating the correcting structure: said motor is configured with a detector, said detector is used to detect the vibration or noise of said motor, and to generate a second operating signal, said detector is connected to a correcting device, said motor control system includes a control order selection unit, a modulation signal control unit, a harmonic voltage weight selection unit, a pulse modulation part, an inverter circuit and a feedback device, wherein said control order selection unit is connected to an order generating device, said order generating device is used to generate a modulation order, said control order selection unit converts said modulation order indicating the duty ratio into a control order, said control order refers to speed order or torque order, said harmonic voltage weight selection unit is connected to the correcting device, said correcting device is used to adjust the selection of the weight value of the harmonic wave corresponding to said control order, said control order selection unit is connected to said modulation signal control unit and said harmonic voltage weight selection unit, said modulation signal control unit and said harmonic voltage weight selection unit are respectively connected to said pulse modulation part, said pulse modulation part is connected to said inverter circuit, said inverter circuit is connected to said motor, said feedback device is connected to said motor and said modulation signal control unit, said feedback device is used to detect the operating status of said motor, and to transmit a first operation signal to said modulation signal control unit, said first operation signal includes the speed and torque of said motor, said modulation signal control unit is used to generate a pulse output duty ratio modulation signal based on said control order and said first operation signal, said harmonic voltage weight selection unit stores the plurality of the weight value of the harmonic wave of the harmonic voltage, said harmonic voltage weight selection unit includes a selection part, said selection part is used to select the corresponding weight value of the harmonic wave based on said control order, said pulse modulation part generates the plurality of control signals based on the modulation signal indicating the pulse output duty ratio, the weight value of the harmonic wave, and the externally input pulse modulation carrier frequency signal, said inverter circuit drives the motor based on the control signal;

issuing a modulation order: the order generating device issues the modulation order to the motor control system;

detection: the detector detects the vibration or noise of the motor, and generates the second operating signal;

checking the operating status of the motor: based on the second operating signal, the correcting device judges if the degree of vibration or noise of the motor meets the anticipation of said control order;

adjusting the selection of the weight value of the harmonic wave: if the degree of vibration or noise of said motor meets the anticipation of said control order, the correcting device maintains the corresponding weight value of the harmonic wave selected by said harmonic voltage weight selection unit based on said control order, if the degree of vibration or noise of the motor does not meet the anticipation of said control order, the correcting device removes the corresponding weight value of the harmonic wave selected by said harmonic voltage weight selection unit based on said control order;

repeatedly executing the step to issue the modulation order, the detection step, the step to check the operating status of the motor, and the step to adjust the selection of the weight value of the harmonic wave, so as to adapt the motor control system to the motor;

in particular, when executing the step to adjust the selection of the weight value of the harmonic wave, the weight value of the harmonic wave selected by said harmonic voltage weight selection unit based on said control order is maintained, and the step to issue the modulation order is executed again, a different control order is issued to the motor control system;

when executing the step to adjust the selection of the weight value of the harmonic wave, the weight value of the harmonic wave selected by said harmonic voltage weight selection unit based on said control order is removed, and the step to issue the modulation order is executed again, the same control order is issued to the motor control system, thus, the weight value of the harmonic wave stored by said harmonic voltage weight selection unit is adapted to said control order.

5. The method for correcting the motor control system defined in claim 4, wherein, during the step to control the motor operation, the inverter circuit drives the motor to run in the offline state.

* * * * *